US012665811B2

(12) United States Patent
Deevarpalli et al.

(10) Patent No.: US 12,665,811 B2
(45) Date of Patent: Jun. 23, 2026

(54) CONFIGURATION OF AN INDUSTRIAL COMMUNICATION SYSTEM

(71) Applicant: Schneider Electric Industries SAS, Rueil Malmaison (FR)

(72) Inventors: Praveen Kumar Deevarpalli, L'Isle d'Espagnac (FR); Loïc Caseras-Noale, Dirac (FR); Marc Denis, Saint-Yrieix-sur-Charente (FR)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 39 days.

(21) Appl. No.: 18/438,590

(22) Filed: Feb. 12, 2024

(65) Prior Publication Data

US 2024/0275673 A1 Aug. 15, 2024

(30) Foreign Application Priority Data

Feb. 15, 2023 (EP) ..................................... 23305197

(51) Int. Cl.
*H04L 41/0823* (2022.01)
*H04L 41/084* (2022.01)

(52) U.S. Cl.
CPC ...... *H04L 41/0836* (2013.01); *H04L 41/0846* (2013.01)

(58) Field of Classification Search
None
See application file for complete search history.

(56) References Cited

U.S. PATENT DOCUMENTS 10,045,174 B1 *    8/2018    Rao .......................... H04W 4/50
2007/0014243 A1 *    1/2007    Meyer ..................... H04L 69/24
370/249

(Continued)

OTHER PUBLICATIONS

Haase, Jan et al., "Wireless sensor/actuator device configuration by NFC", 2016 IEEE International Conference on Industrial Technology (ICIT), Mar. 14, 2016, pp. 1336-1340.

(Continued)

*Primary Examiner* — Mohamed Ibrahim
(74) *Attorney, Agent, or Firm* — Quinn IP Law

(57) ABSTRACT

An apparatus for configuration of a second communication device intended to replace a first communication device, including: a mechanical part adapted to complete the structure of the first communication device and the structure of the second communication device, and a RFID tag linked to a processing unit and a memory. The RFID tag includes a receiver configured to receive a first input signal from a first RFID reading device located in the first communication device, wherein the first input signal includes configuration data of the first communication device, when the apparatus is linked to the first communication device. The processing unit is configured to store the configuration data in the memory. The receiver is further configured to receive a second input signal from a second RFID reading device located in the second communication device, wherein the second input signal includes a request for configuration data, when the apparatus is linked to the second communication device. The processing unit is configured to retrieve the configuration data in the memory. The RFID tag includes a transmitter configured to transmit an output signal to the second RFID reading device, wherein the output signal includes the configuration data.

11 Claims, 2 Drawing Sheets

(56)        References Cited

U.S. PATENT DOCUMENTS

2008/0204199 A1*   8/2008   Howarth  ............ G08B 13/2417
                                                            340/10.1
2013/0102963 A1    4/2013   Marsh et al.
2018/0060616 A1*   3/2018   Meyer  ................ G06K 7/10227
2022/0164215 A1*   5/2022   Feng  ................... G06F 9/45558

OTHER PUBLICATIONS

Schmidmaier, Richard, "Interactive RFID and NFC Enable New Applications in Electronics", Jan. 1, 2013, 2 pp. 1-9, retrieved from the Internet: URL:<https://www.pcb-pool.com/download/Interactive>, retrieved on Jul. 13, 2017.
European Search Report and Search Opinion dated Jul. 12, 2023 for corresponding European Patent Application No. EP 233051978, 9 pages.

* cited by examiner

S1

APP linked to CD1
CD1 → [ConfD] → APP

S2

APP, PU : storing ConfD in MEM

S3

CD2 replacing CD1
APP linked to CD2

S4

CD2 → [Req] → APP

S5

APP, PU : retrieving ConfD in MEM

S6

APP → [ConfD] → CD2

S7

CD2 : configuring CD2 based on ConfD

CONFIGURATION OF AN INDUSTRIAL COMMUNICATION SYSTEM

FIELD OF INVENTION

The present invention relates to communication systems comprising a first communication device intended to be replaced by a second communication device. In particular, it concerns configuration of the second communication device in a replacement phase.

BACKGROUND

In industrial communication systems, there is a need to replace a first communication device by a second communication device in an efficient way in order to guarantee a continuity of service provided by the first communication device and the second communication device.

This can be performed manually, for example with the involvement of a security administrator that needs to configure the second communication device as the first communication device.

A common way to configure the second communication device is to use a SD card that was inserted in the first communication device and then inserted in the second communication device to be configured.

However the use of SD card presents at least the drawbacks of dust accumulation in the slot of SD card, chances of misplacing or losing the SD card. Moreover, the SD card is perceived as potential malware infection source (cybersecurity risk against some polices).

There is therefore a need for improving device replacement, with an efficient configuration of a second communication device replacing a first communication device.

SUMMARY

This summary is provided to introduce concepts related to the present inventive subject matter. This summary is not intended to identify essential features of the claimed subject matter nor is it intended for use in determining or limiting the scope of the claimed subject matter.

In one implementation, there is provided an apparatus for configuration of a second communication device intended to replace a first communication device, comprising:

a mechanical part adapted to complete the structure of the first communication device and the structure of the second communication device, a RFID tag linked to a processing unit and a memory, wherein the RFID tag comprises a receiver configured to receive a first input signal from a first RFID reading device located in the first communication device, wherein the first input signal comprises configuration data of the first communication device, when the apparatus is linked to the first communication device, wherein the processing unit is configured to store the configuration data in the memory, wherein the receiver is further configured to receive a second input signal from a second RFID reading device located in the second communication device, wherein the second input signal comprises a request for configuration data, when the apparatus is linked to the second communication device, wherein the processing unit is configured to retrieve the configuration data in the memory, wherein the RFID tag comprises a transmitter configured to transmit an output signal to the second RFID reading device, wherein the output signal comprises the configuration data.

Advantageously, the second communication device can replace the first communication device using the apparatus in a plug and play manner, allowing an automatic configuration restoration without risk of cybersecurity, for example due to human mistakes.

Advantageously, the mechanical part is dedicated to the first communication device and the second communication device, in order to complete the structure of only that kind of communication device and to communicate also with only that kind of communication device.

In an embodiment, the configuration data comprise information for internal communication inside the first communication device.

In an embodiment, the configuration data comprise information for external communication of the first communication device.

In an embodiment, the configuration data comprise content data used by at least one application of the first communication device.

In an embodiment, the apparatus is linked to the first communication device or second communication device when the mechanical part completes the structure of the first communication device or the structure of a second communication device, allowing communication between the RFID tag and the first RFID reading device or the second RFID reading device.

In an embodiment, the RFID tag is a passive tag.

In an embodiment, the first input signal contains a writing flag that is interpreted by the processing unit as a request for writing the configuration data in the memory.

In an embodiment, the first input signal contains a writing flag that is interpreted by the processing unit as a request for writing the configuration data in the memory.

In an embodiment, the configuration data are signed by the processing unit and the second communication device checks if the signature of configuration data is correct before using the received configuration data.

In another implementation, there is provided a method for configuration of a second communication device intended to replace a first communication device, comprising the following steps in an apparatus comprising a mechanical part adapted to complete the structure of a first communication device and the structure of a second communication device, and a RFID tag linked to a processing unit and a memory:

receiving, by a receiver of the RFID tag, a first input signal from a first RFID reading device located in the first communication device, wherein the first input signal comprises configuration data of the first communication device, storing, by the processing unit, the configuration data in the memory, receiving, by a receiver of the RFID tag, a second input signal from a second RFID reading device located in the second communication device, when the apparatus is connected to the second communication device, wherein the second input signal comprises a request for configuration data, retrieving, by the processing unit, the configuration data in the memory, transmitting, by a transmitter of the RFID tag, an output signal to the second RFID reading device, wherein the output signal comprises the configuration data.

In another implementation there is provided a non-transitory computer-readable medium having embodied thereon a computer program for executing a method for configuration of a second communication device intended to replace a first communication device. Said computer program comprises instructions which carry out steps according to the method according to the invention.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

The same reference number represents the same element or the same type of element on all drawings.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
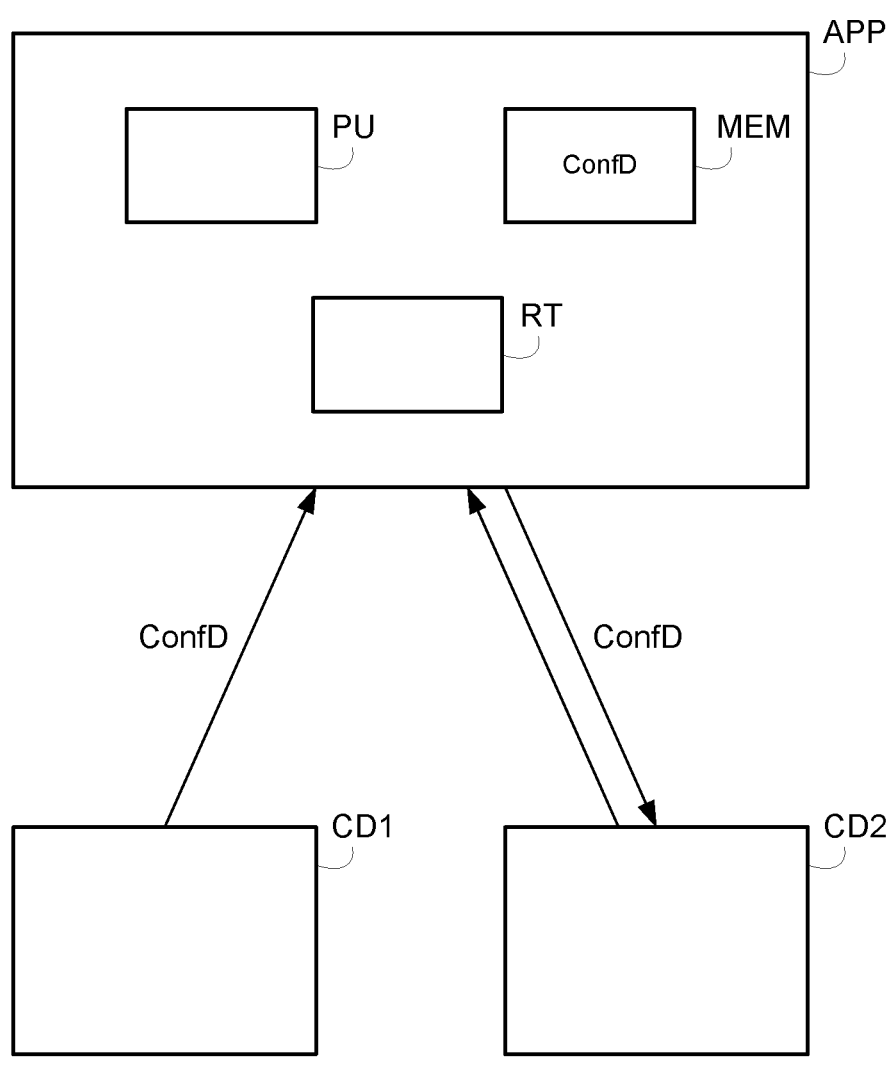
FIG. 1 shows a schematic block diagram of a communication system according to one embodiment of the invention for configuration of a second communication device intended to replace a first communication device.

Referring to FIG. 1, a communication system comprises a first communication device CD1, a second communication device CD2 and an apparatus APP.

A communication device CD1, CD2 may be any kind of device implementing communication means, such as radio-communication means. For example, a communication device is an industrial device used in an industrial automation system.

The first communication device CD1 is assumed to be similar to the second communication device CD2, as the second communication device CD2 is intended to replace the first communication device CD1.

In one embodiment, the communication device comprises a master module and a set of slave modules. In one embodiment, the slave modules are connected in chain to the master module via a field bus line, forming for example a "Daisy" chain. A slave module is a communication module using an application, dedicated sensors and a communication protocol. In one embodiment, the slave modules are radio modules using Zigbee, Bluetooth, WiFi and IO Link Wireless based Industrial IoT (Internet of Things), or other wireless protocols. In one example the master module and the slave modules form a wireless gateway device managing an application using various wireless protocol radio integrated in modular way within the same gateway device. In one embodiment for industrial application, the slave modules are arranged in a stacked-up manner upon the master module, forming a wireless gateway system under the form of a column.

In one embodiment, the communication device comprises a light appliance and/or a sound appliance.

The communication device comprises one or more processor(s), I/O interface(s), network interfaces, and a memory coupled to the processor(s). The communication device stores configuration data ConfD in the memory, the configuration data being used for the operation of the communication device, for example by an application implemented in the communication device.

In one embodiment, the configuration data ConfD comprises information for internal communication inside the communication device.

In one embodiment, the configuration data ConfD comprises information for external communication of the communication device.

In one embodiment, the configuration data ConfD comprises content data used by at least one application of the communication device.

In one example with the communication device comprising a master module and a set of slave modules, the configuration data contains the name, identifier, type and address of the slave modules. The configuration data further comprises parameters relating to a communication protocol used between the master module and the slave modules. The configuration data may further comprise parameters relating to a communication protocol used by the master module to communicate with an external network. The configuration data may further comprise parameters relating to a communication protocol used by at least one slave module to communicate to transmit data on a radio network.

For example, each slave module has configuration data relating to the operation of the slave device. For example, the slave device is associated with specific sensors and the configuration data define the configuration of the slave device to communicate with the specific sensors.

The communication device further comprises a RFID (Radio-Frequency Identification) reader. The RFID reader RR comprises a set of antennas associated with a communication module allowing transmission and reception of signals. The RFID reader has a transmitter/receiver unit which transmits a signal to and receives a response from a RFID tag included in the apparatus APP.

A typical RFID system consists of two major blocks: a RFID reader and a RFID tag (as remote unit). The tag has a unique identification code incorporated into an ID circuit and this code becomes associated with the object to which the RFID tag is associated.

In one embodiment, the RFID reader is able to send an input signal comprising a sequence of bits, corresponding for example to configuration data, toward a RFID tag and then to receive a signal encrypted by the RFID tag according to a certificate already known by the RFID reader for the purpose of decryption.

In one embodiment, the RFID tag is a passive tag able to read and write data. The RFID tag does not have a built-in power source and can rely on the energy transmitted by the RFID reader to function. The RFID reader sends a radio wave that energizes the RFID tag and powers it up. Then the RFID tag can use this energy to transmit its signal back to the RFID reader.

The apparatus APP comprises a circuit board comprising a RFID tag RT linked to a processing unit PU and a memory MEM.

The RFID tag comprises a receiver configured to receive an input signal from a communication device and a transmitter configured to transmit an output signal to a communication device.

More especially, the receiver is configured to receive a first input signal from a first RFID reading device located in the first communication device CD1, the first input signal comprising configuration data ConfD of the first communication device CD1. The processing unit PU is then able to store the received configuration data ConfD in the memory MEM. The first communication device CD1 can send this first input signal based on a regular period and based on event, in order to update the last version of the configuration of the first communication device.

In one embodiment, the first input signal contains a writing flag that is interpreted by the processing unit PU as a request for writing the configuration data ConfD in the memory MEM.

In one embodiment, the size of the memory is tailored to store a set of data limited to the configuration data ConfD and information to perform a signature. This size limitation avoids the possibility of corruption of the memory, to install a virus for example.

As a second communication device intended to replace the first communication device, the second communication device should operate the same manner as the first communication device and needs to be configured as the first communication device.

The receiver is further configured to receive a second input signal from a second RFID reading device located in the second communication device CD2, the second input signal comprising a request for configuration data.

The processing unit PU is then able to retrieve the configuration data ConfD in the memory MEM.

In one embodiment, the second input signal contains a reading flag that is interpreted by the processing unit PU as a request for reading the content of the memory MEM, i.e. the configuration data, and for transmitting the read content.

The RFID tag further comprises a transmitter configured to transmit an output signal to the second RFID reading device located in the second communication device CD2, the output signal comprising the configuration data ConfD. The second communication device CD2 can thus retrieve the configuration data ConfD of the first communication device CD1.

In one embodiment, the processing unit PU performs a signature of the configuration data before sending them to the second communication device CD2 that can then compare the signature (for example via a checksum) of the received configuration data with a signature performed by the second communication device on the received configuration data. If the signatures match, the second communication device CD2 uses the received configuration data to set the configuration of the second communication device CD2.

When the second communication device CD2 replaces the first communication device CD1, the second communication device CD2 can retrieve automatically the configuration data ConfD of the first communication device CD1 thanks to the apparatus APP. In one example with a first communication device CD1 and a second communication device CD2 comprising a master module and a set of slave modules, the second communication device CD2 retrieves the configuration data ConfD of the first communication device CD1 to store information of the slave modules, such as name, identifier, type and address of the slave modules and information to set up parameters of internal and external communication of the first communication device CD1. The second communication device CD2 is then ready to operate in the same manner as the first communication device CD1.

The apparatus APP comprises a mechanical part adapted to complete the structure of the first communication device CD1 and the structure of the second communication device CD2.

In one embodiment, the shape of the mechanical part of the apparatus APP is dedicated to fit a shape of a specific mechanical part of the first communication device CD1 and the second communication device CD2.

In one embodiment, the mechanical part of the apparatus APP is complementary to the structure of the communication device in order to be integrated in the communication device and form a complete product.

In one example, the communication device presents the shape of a column and the apparatus acts as a base support or cap.

In one embodiment, the communication device and the apparatus have no electrical connection.

Figure 2:
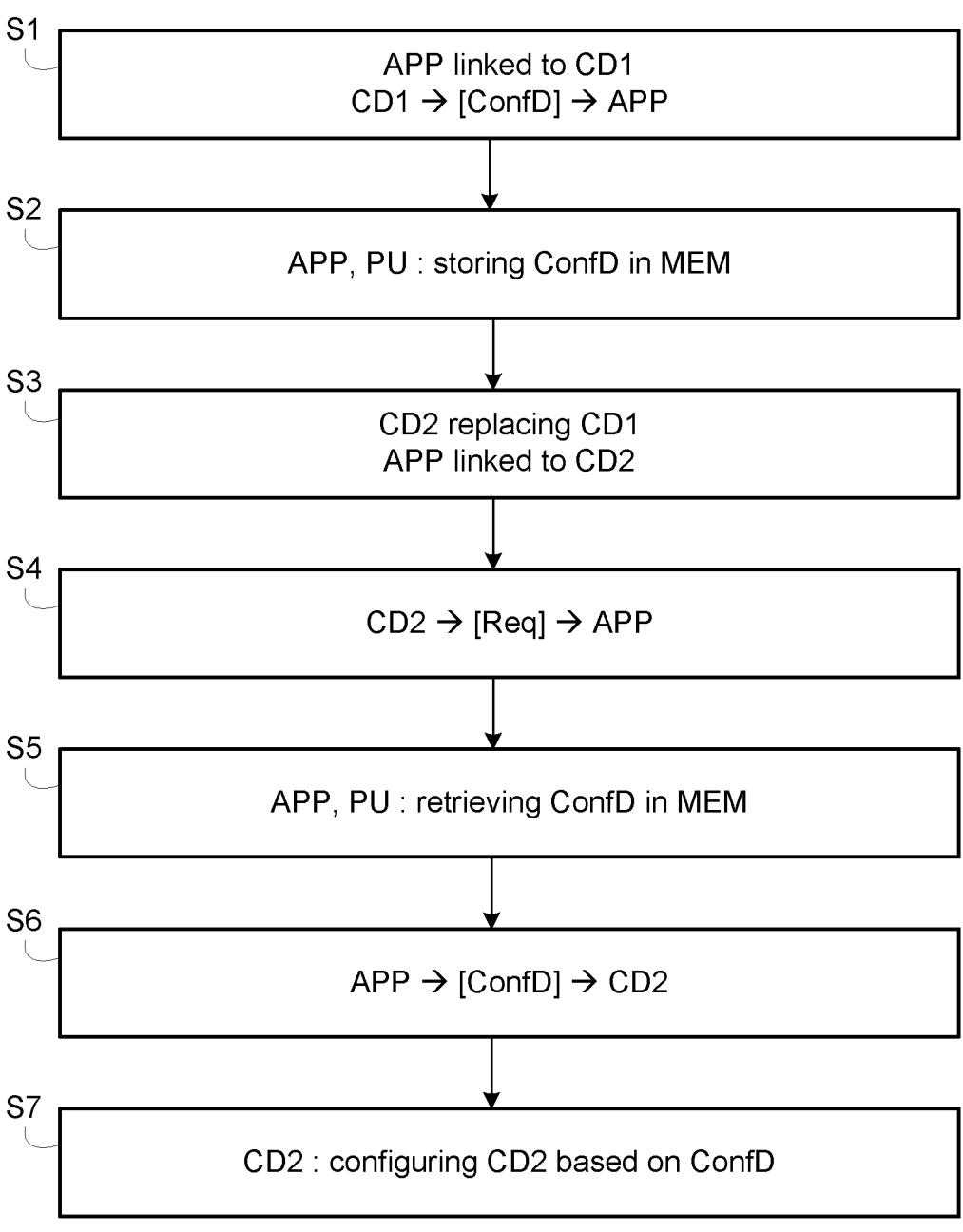
FIG. 2 shows a flow chart illustrating a method for configuration of a second communication device intended to replace a first communication device according to one embodiment of the invention.

With reference to FIG. 2, a method for configuration of a second communication device intended to replace a first communication device according to one embodiment of the invention comprises steps S1 to S7.

Initially, the apparatus APP is linked to the first communication device CD1 that is in operation. The mechanical part completes the structure of the first communication device, allowing communication between the RFID tag RT and the first RFID reading device.

In step S1, the first communication device CD1 sends a first input signal to the RFID tag RT of the apparatus APP. The first input signal contains configuration data ConfD of the first communication device CD1.

In step S2, the processing unit PU stores the configuration data ConfD in the memory MEM. For example, the first input signal contains a writing flag that is interpreted by the processing unit PU as a request for writing the configuration data ConfD in the memory MEM.

In step S3, the first communication device CD1 is replaced by a second communication device CD2. It is assumed that the second communication device CD2 needs to be configured to be ready to operate the same manner as the first communication device.

The apparatus APP is linked to the second communication device CD2 that needs to be configured. Thus the apparatus APP was disconnected from the first communication device and connected to the second communication device. The mechanical part completes the structure of the second communication device, allowing communication between the RFID tag RT and the second RFID reading device.

In step S4, the second communication device CD2 sends a second input signal to the RFID tag of the apparatus APP. The second input signal contains a request Req for configuration data.

In step S5, the processing unit PU recognizes the request Req for configuration data and retrieves the configuration data ConfD in the memory. In one example, the second input signal contains a reading flag that is interpreted by the processing unit PU as a request for reading the content of the memory.

In step S6, the processing unit PU commands the transmitter of the RFID tag to transmit an output signal to the second communication device CD2, the output signal comprising the configuration data ConfD.

In step S7, the second communication device CD2 uses the received configuration data ConfD to set the configuration of the second communication device CD2.

If the configuration data are signed, the second communication device CD2 checks if the signature of configuration data is correct before using the received configuration data.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments.

The invention claimed is:

1. An apparatus for configuration of a second communication device intended to replace a first communication device, comprising:

a mechanical part adapted to complete a structure of the first communication device and a structure of the second communication device, wherein a shape of the mechanical part of the apparatus is configured to fit a shape of a mechanical part of the first communication device and is further configured to fit a shape of a mechanical part of the second communication device, a radio-frequency identification (RFID) tag linked to a processing unit and a memory, wherein the RFID tag comprises a receiver configured to receive a first input signal from a first RFID reading device located in the first communication device, wherein the first input signal comprises configuration data of the first communication device, when the apparatus is linked to the first communication device, wherein the processing unit is configured to store the configuration data in the memory, wherein the receiver is further configured to receive a second input signal from a second RFID reading device located in the second communication device, wherein the second input signal comprises a request for configuration data, when the apparatus is linked to the second communication device, wherein the processing unit is configured to retrieve the configuration data in the memory, wherein the RFID tag comprises a transmitter configured to transmit an output signal to the second RFID reading device, wherein the output signal comprises the configuration data.

2. The apparatus according to claim 1, wherein the first input signal contains a writing flag.

3. The apparatus according to claim 2, wherein the writing flag is interpreted by the processing unit as a request for writing the configuration data in the memory.

4. The apparatus according to claim 1, wherein the configuration data comprise information for internal communication inside the first communication device.

5. The apparatus according to claim 1, wherein the configuration data comprise information for external communication of the first communication device.

6. The apparatus according to claim 1, wherein the configuration data comprise content data used by at least one application of the first communication device.

7. The apparatus according to claim 1, wherein the apparatus is linked to the first communication device or the second communication device when the mechanical part completes the structure of the first communication device or the structure of the second communication device, allowing communication between the RFID tag and the first RFID reading device or the second RFID reading device.

8. The apparatus according to claim 1, wherein the RFID tag is a passive tag.

9. The apparatus according to claim 1, wherein the configuration data are signed by the processing unit and the second communication device checks if the signature of configuration data is correct before using the received configuration data.

10. A method in an apparatus for configuration of a second communication device intended to replace a first communication device, the apparatus comprising a mechanical part adapted to complete a structure of the first communication device and a structure of the second communication device, and a radio-frequency identification (RFID) tag linked to a processing unit and a memory, wherein a shape of the mechanical part of the apparatus is configured to fit a shape of a mechanical part of the first communication device and is further configured to fit a shape of a mechanical part of the second communication device, the method comprising:

receiving, by a receiver of the RFID tag, a first input signal from a first RFID reading device located in the first communication device, wherein the first input signal comprises configuration data of the first communication device, storing, by the processing unit, the configuration data in the memory, receiving, by the receiver of the RFID tag, a second input signal from a second RFID reading device located in the second communication device, when the apparatus is connected to the second communication device, wherein the second input signal comprises a request for configuration data, retrieving, by the processing unit, the configuration data in the memory, transmitting, by a transmitter of the RFID tag, an output signal to the second RFID reading device, wherein the output signal comprises the configuration data.

11. A non-transitory computer readable storage medium, with a computer program stored thereon, said computer program comprising instructions for, when executed by a processor, carrying out the method according to claim 10.

* * * * *